US012483715B2

(12) United States Patent
Lainema et al.

(10) Patent No.: US 12,483,715 B2
(45) Date of Patent: Nov. 25, 2025

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Jani Lainema, Tampere (FI); Emre Baris Aksu, Tampere (FI); Miska Matias Hannuksela, Tampere (FI); Alireza Zare, Tampere (FI); Francesco Cricri, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/759,550

(22) PCT Filed: Feb. 4, 2021

(86) PCT No.: PCT/FI2021/050076
§ 371 (c)(1),
(2) Date: Jul. 27, 2022

(87) PCT Pub. No.: WO2021/170901
PCT Pub. Date: Sep. 2, 2021

(65) Prior Publication Data
US 2023/0110503 A1    Apr. 13, 2023

(30) Foreign Application Priority Data

Feb. 24, 2020  (FI) .................................... 20205186

(51) Int. Cl.
*H04N 19/82* (2014.01)
*G06N 20/00* (2019.01)
(Continued)

(52) U.S. Cl.
CPC ............. *H04N 19/42* (2014.11); *G06N 20/00* (2019.01); *H04N 19/117* (2014.11);
(Continued)

(58) Field of Classification Search
CPC .... H04N 19/42; H04N 19/117; H04N 19/172; H04N 19/176; H04N 19/463; G06N 20/00
See application file for complete search history.

(56) References Cited

U.S. PATENT DOCUMENTS

2005/0089215 A1  4/2005  Staelin et al.
2007/0160134 A1  7/2007  Segall
(Continued)

FOREIGN PATENT DOCUMENTS

WO  WO-2019115865 A1  6/2019
WO     2019/197712 A1  10/2019
(Continued)

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
(Continued)

*Primary Examiner* — Patrick E Demosky
(74) *Attorney, Agent, or Firm* — McCarter & English LLP

(57) ABSTRACT

The embodiments relate to method for encoding and decoding, wherein the method for encoding comprises receiving an input block of a video frame for encoding; applying at least a learning-based model (702) for said input block as a processing step for encoding the block; combining (703) an output of a learning-based model with one or more data sources (712, 713) by a combination process; encoding block to a bitstream (40); using a result of the combination process as additional input for the learning-based model for encoding a subsequent block; and encoding to a bitstream combination information (720) used in the combination process, said combination information comprising at least (Continued)

one or more combination parameters. The embodiments also relate to technical equipment for implementing the methods.

20 Claims, 12 Drawing Sheets

(51) Int. Cl.
    *H04N 19/117*     (2014.01)
    *H04N 19/172*     (2014.01)
    *H04N 19/176*     (2014.01)
    *H04N 19/42*     (2014.01)
    *H04N 19/463*     (2014.01)

(52) U.S. Cl.
    CPC ......... *H04N 19/172* (2014.11); *H04N 19/176* (2014.11); *H04N 19/463* (2014.11)

(56) References Cited

U.S. PATENT DOCUMENTS

| | | |
|---|---|---|
| 2018/0184123 A1 | 6/2018 | Terada et al. |
| 2018/0249158 A1 | 8/2018 | Huang et al. |
| 2019/0124348 A1 | 4/2019 | Yang |
| 2019/0273948 A1 | 9/2019 | Yin et al. |
| 2019/0356330 A1* | 11/2019 | Minnen .................. G06N 7/01 |
| 2019/0364242 A1* | 11/2019 | Hayashi ............. H04N 21/8455 |
| 2021/0152831 A1* | 5/2021 | Liu ...................... H04N 19/463 |
| 2022/0007015 A1* | 1/2022 | Ma ........................ H04N 19/85 |

FOREIGN PATENT DOCUMENTS

| | | | | |
|---|---|---|---|---|
| WO | WO-2019229728 A1 | * | 12/2019 | ........... G06N 3/0454 |
| WO | WO-2021030414 A1 | * | 2/2021 | ............. B60Q 1/076 |

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

Office action received for corresponding Finnish Patent Application No. 20205186, dated Sep. 24, 2020, 12 pages.

International Search Report and Written Opinion received for corresponding Patent Cooperation Treaty Application No. PCT/FI2021/050076, dated May 11, 2021, 17 pages.

Jia et al., "Spatial-temporal residue network based in-loop filter for video coding", IEEE Visual Communications and Image Processing (VCIP), Dec. 10-13, 2017, 4 pages.

* cited by examiner

METHOD, AN APPARATUS AND A COMPUTER PROGRAM PRODUCT FOR VIDEO ENCODING AND VIDEO DECODING

RELATED APPLICATION

This application was originally filed as PCT Application No. PCT/FI2021/050076, filed on Feb. 4, 2021, which claims priority from Finnish Application No. 20205186, filed on Feb. 24, 2020, each of which is incorporated herein by reference in its entirety.

TECHNICAL FIELD

The present solution generally relates to video encoding and decoding. In particular, the solution relates to learning-based algorithm being used in encoding and decoding.

BACKGROUND

Recently, the development of various neural network techniques and other learning-based algorithms has enabled their extensive utilization in various applications.

Lately, neural networks have been used for compressing and de-compressing data such as images. One of the used architectures for such task is the auto-encoder, which is a neural network consisting of two parts: a neural encoder and a neural decoder. The neural encoder takes as input an image and produces a code which requires less bits than the input image. This code may have obtained by a binarization or quantization process after the neural encoder. The neural decoder takes in this code and reconstructs the image which was input to the neural encoder.

SUMMARY

The present embodiments are targeted to improve neural decoder. The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method comprising receiving an input block of a video frame for encoding;
  applying at least a learning-based model for said input block as a processing step for encoding the block;
  combining an output of a learning-based model with one or more data sources by a combination process;
  encoding block to a bitstream;
  using a result of the combination process as additional input for the learning-based model for encoding a subsequent block; and
  encoding to a bitstream combination information used in the combination process, said combination information comprising at least one or more combination parameters.

According to a second aspect, there is provided a method comprising receiving an encoded bitstream for decoding;
  decoding from the bitstream a block of a video frame;
  applying at least a learning-based model for said block as a processing step for decoding the block;
  decoding one of more combination parameters from a bitstream;
  combining an output of a learning-based model with one or more data sources by a combination process by using said decoded combination parameters; and
  using a result of the combination process as additional input for the learning-based model for decoding a subsequent block.

According to a third aspect, there is provided an apparatus, comprising:
  means for receiving an input block of a video frame for encoding;
  means for applying at least a learning-based model for said input block as a processing step for encoding the block;
  means for combining an output of a learning-based model with one or more data sources by a combination process;
  means for encoding block to a bitstream;
  means for using a result of the combination process as additional input for the learning-based model for encoding a subsequent block; and
  means for encoding to a bitstream combination information used in the combination process, said combination information comprising at least one or more combination parameters.

According to a fourth aspect, there is provided an apparatus, comprising:
  means for receiving an encoded bitstream for decoding;
  means for decoding from the bitstream a block of a video frame;
  means for applying at least a learning-based model for said block as a processing step for decoding the block;
  means for decoding one or more combination parameters from a bitstream;
  means for combining an output of a learning-based model with one or more data sources by a combination process by using said decoded combination parameters; and
  means for using a result of the combination process as additional input for the learning-based model for decoding a subsequent block.

According to a fifth aspect, there is provided an apparatus comprising at least one processor, memory including computer program code, the memory and the computer program code configured to, with the at least one processor, cause the apparatus to perform at least the following:
  receive an input block of a video frame for encoding;
  apply at least a learning-based model for said input block as a processing step for encoding the block;
  combine an output of a learning-based model with one or more data sources by a combination process;
  encode block to a bitstream;
  use a result of the combination process as additional input for the learning-based model for encoding a subsequent block; and
  encode to a bitstream combination information used in the combination process, said combination information comprising at least one or more combination parameters.

According to a sixth aspect, there is provided an apparatus comprising at least one processor, memory including computer program code, the memory and the computer program code configured to, with the at least one processor, cause the apparatus to perform at least the following:

receive an encoded bitstream for decoding;
decode from the bitstream a block of a video frame;
apply at least a learning-based model for said block as a processing step for decoding the block;
decode one or more combination parameters from a bitstream;
combine an output of a learning-based model with one or more data sources by a combination process by using said decoded combination parameters; and
use a result of the combination process as additional input for the learning-based model for decoding a subsequent block.

According to a seventh aspect, there is provided a computer program product comprising computer program code configured to, when executed on at least one processor, cause an apparatus or a system to:
receive an input block of a video frame for encoding;
apply at least a learning-based model for said input block as a processing step for encoding the block;
combine an output of a learning-based model with one or more data sources by a combination process;
encode block to a bitstream;
use a result of the combination process as additional input for the learning-based model for encoding a subsequent block; and
encode to a bitstream combination information used in the combination process, said combination information comprising at least one or more combination parameters.

According to an eighth aspect, there is provided a computer program product comprising computer program code configured to, when executed on at least one processor, cause an apparatus or a system to:
receive an encoded bitstream for decoding;
decode from the bitstream a block of a video frame;
apply at least a learning-based model for said block as a processing step for decoding the block;
decode one or more combination parameters from a bitstream;
combine an output of a learning-based model with one or more data sources by a combination process by using said decoded combination parameters; and
use a result of the combination process as additional input for the learning-based model for decoding a subsequent block.

According to an embodiment, the learning-based model is a neural network.

According to an embodiment, the learning-based model is a neural network filter.

According to an embodiment, the one or more data sources comprises any one or more of the following: input of the learning-based model; output of one or more learning-based filters; output of one or more conventional filters.

According to an embodiment, the combination process is a linear combination or a neural network.

According to an embodiment, the apparatus further comprises using a result of the combination process as ground-truth for a fine-tuning process.

According to an embodiment, an output of the learning-based model is determined as a difference or an update, whereupon the method comprises adding the difference or the update to input of the learning-based model.

According to an embodiment, the apparatus further comprises means for determining a loss between the output of the learning-based model for previously-decoded blocks and output of the enhanced blocks, and means for updating the learning-based model by using the determined loss.

DESCRIPTION OF THE DRAWINGS

In the following, various embodiments will be described in more detail with reference to the appended drawings, in which.

DESCRIPTION OF EXAMPLE EMBODIMENTS

In the following, several embodiments will be described in the context of neural networks (NN). In particular, the several embodiments target in improving decoder-side neural network by leveraging combination information. Combination information refers to an information that indicates how an output of a learning-based model is combined with one or more data sources, which information may be further utilized in encoding subsequent blocks. It is to be noted, however, that the invention is not limited to neural networks. In fact, the different embodiments have applications in any machine learning environment.

Deep learning is a solution for analyzing data and is a sub-field of machine learning which has emerged in the recent years. Deep learning is a field, which studies artificial neural networks (ANN), also referred to as neural network (NN). A neural network is a computation graph representation, usually made of several layers of successive computation. Each layer is made of units or neurons computing an elemental/basic computation. A unit is connected to one or more other units, and the connection may have associated a weight. The weight may be used for scaling the signal passing through the associated connection. Weights may be learnable parameters, i.e., values which can be learned from training data. There may be other learnable parameters, such as those of batch-normalization layers.

Deep learning may involve learning of multiple layers of nonlinear processing units, either in supervised or in unsupervised manner, or in semi-supervised manner. Each learned layer extracts feature representations from the input data. Features from lower layers represent low-level semantics (i.e. less abstract concepts, such as edges and texture), whereas higher layers represent higher-level semantics (i.e., more abstract concepts, like scene class). Unsupervised learning applications typically include pattern analysis and representation (i.e., feature) learning, whereas supervised learning applications may include classification of image objects (in the case of visual data).

Deep learning techniques may be used e.g. for recognizing and detecting objects in images or videos with great accuracy, outperforming previous methods. In addition, deep learning techniques are utilized in an ever-creasing number of applications for any type of device.

Figure 1:
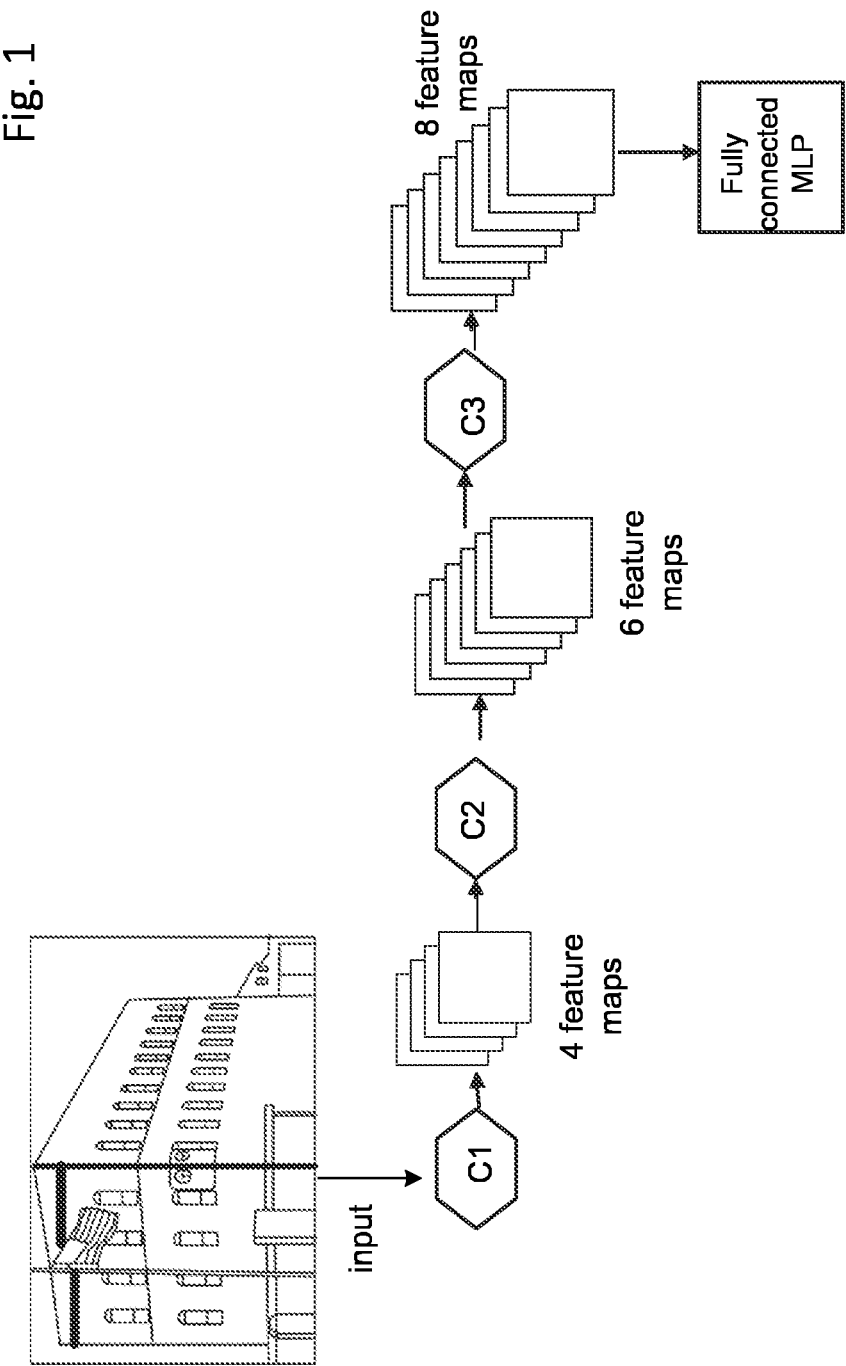
FIG. 1 shows an example of a convolutional neural network.

Deep learning expects training in order to be able to perform the expected analysis. During the training stage, deep learning techniques build computation layers which extract features of increasingly abstract level. Thus, at least the initial layers of an artificial neural network represent a feature extractor. The basic operation of a neural network is discussed with reference to FIG. 1 representing a Convolutional Neural Network including a feature extractor in deep learning techniques. This example of a CNN comprises one or more convolutional layers, fully connected layers, and a classification layer on top. CNNs are relatively easy to train compared to other deep neural networks and have fewer parameters to be estimated. Therefore, CNNs are highly attractive architecture to use, especially in image and speech applications.

In the example of FIG. 1, the input to a CNN is an image, but any other data could be used as well. Each layer of a CNN represents a certain abstraction (or semantic) level, and the CNN extracts multiple feature maps. A feature map may for example comprise a dense matrix of Real numbers representing values of the extracted features. The CNN in FIG. 1 has only three feature (or abstraction, or semantic) layers C1, C2, C3 for the sake of simplicity, but CNNs may have more than three convolution layers.

The first convolution layer C1 of the CNN may comprise extracting 4 feature-maps from the first layer (i.e. from the input image). These maps may represent low-level features found in the input image, such as edges and corners. The second convolution layer C2 of the CNN, which may extract 6 feature-maps from the previous layer, increases the semantic level of the extracted features. Similarly, the third convolution layer C3 may represent more abstract concepts found in images, such as combinations of edges and corners, shapes, etc. The last layer of the CNN, referred to as fully connected Multi-Layer Perceptron (MLP) may include one or more fully-connected (i.e., dense) layers and a final classification layer. The MLP uses the feature-maps from the last convolution layer in order to predict (recognize) for example the object class. For example, it may predict that the object in the image is a house.

The goal of a neural network is to transform the input data into a more useful output. One example is classification, where input data is classified into one of N possible classes (e.g., classifying if an image contains a cat or a dog). Another example is regression, where input data is transformed into a Real number (e.g. determining the music beat of a song).

The power of neural networks comes from the internal representation which is built inside the layers. This representation is distributed among many units and is hierarchical, where complex concepts build on top of simple concepts. A neural network has two main modes of operation: training phase and testing phase. The training phase is the development phase, where the neural network learns to perform the final task. Learning may include iteratively updating the parameters of the neural network, for example weights or connections between units. The testing phase is the phase in which the neural network performs the task. Learning can be performed in several ways. The main ones are supervised, unsupervised, and reinforcement learning. In supervised training, the neural network is provided with input-output pairs, where the output may be a label. In supervised training, the neural network is provided only with input data (and also with output raw data in case of self-supervised training). In reinforcement learning, the supervision is sparser and less precise; instead of input-output pairs, the neural network gets input data and, sometimes, delayed rewards in the form of scores (E.g., −1, 0, or +1).

The neural network may be trained on a training data set, which is supposed to be representative of the data on which the neural network will be used. During training, the neural network uses the examples in the training dataset to modify its learnable parameters (e.g., its connections' weights) in order to achieve the desired task. Input to the neural network is the data, and the output of the neural network represents the desired task. Examples of desired tasks are classification of objects in images, denoising of images (or other types of data, such as heart-rate signals), semantic segmentation. For such tasks, the output of the neural network may be a probability distribution over object classes for the whole image, a denoised image, a probability distribution over classes for each input pixel, respectively.

Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layers take input from units in one or more preceding layers, and provide output to one or more of following layers.

Initial layers (those close to the input data) extract semantically low-level features such as edges and textures in images, and intermediate and final layers extract more high-level features. After the feature extraction layers, there may be one or more layers performing a certain task, such as classification, semantic segmentation, object detection, denoising, style transfer, super-resolution etc. In recurrent neural networks, there is a feedback loop, so that the network becomes stateful, i.e., it is able to memorize information or a state.

Neural networks are being utilized in an ever-increasing number of applications for many different types of device, such as mobile phones. Examples include image and video analysis and processing, social media data analysis, device usage data analysis, etc.

One of the important properties of neural networks (and other machine learning tools) is that they are able to learn properties from input data, either in a supervised way or in unsupervised way. Such learning is a result of a training algorithm, or of a meta-level neural network providing the training signal. In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of the losses are mean squared error, cross-entropy, etc. In recent deep learning techniques, training is an iterative process, where at each iteration the algorithm modifies the weights of the neural network to make a gradual improvement of the network's output, i.e., to gradually decrease the loss.

In the present specification, term "weight of neural network" may be sometimes referred to as "learnable parameters".

Training a neural network is an optimization process, but the final goal is different from the typical goal of optimization. In optimization, the only goal is to minimize a functional. In machine learning, the goal of optimization or training process is to make the neural network learn the properties of the data distribution from a limited training dataset. In other words, the goal is to learn to use a limited training dataset in order to learn to generalize to previously unseen data, i.e. data which was not used for training a neural network. This is usually referred to as generalization. In practice, data is usually split into at least two sets, the training set and the validation set. The training set is used for training the neural network, i.e. to modify its learnable parameters in order to minimize the loss. The validation set is used for checking the performance of the neural network on data, which was not used to minimize the loss, as an indication of the final performance of the neural network. In particular, the errors on the training set and on the validation set are monitored during the training process to understand the following things:

If the neural network is learning at all—in this case, the training set error should decrease, otherwise the neural network is in the regime of underfitting.

If the neural network is learning to generalize—in this case, also the validation set error needs to decrease and to be not too much higher than the training set error. If the training set error is low, but the validation set error is much higher than the training set error, or it does not decrease, or it even increases, the neural network is in the regime of overfitting. This means that the neural network has just memorize the training set's properties and performs well only on that set, but performs poorly on a set not used for tuning its learnable parameters.

Lately, neural networks have been used for compressing and de-compressing data such as images. The most widely used architecture for such task is the auto-decoder, which is a neural network consisting of two parts: a neural encoder and a neural decoder. The neural encoder takes as input an image and produces a code which requires less bits than the input image. This code may have obtained by a binarization or quantization process after the neural encoder. The neural decoder takes in this code and reconstructs the image which was input to the neural encoder.

Such neural encoder and neural decoder may be trained to minimize a combination of bitrate and distortion, where the distortion is usually Mean Squared Error (MSE), Peak Signal-to-Noise Ratio (PSNR), Structural Similarity (SSIM), or similar. These distortion metrics are meant to be inversely proportional to the human visual perception quality.

When speaking of a video codec, a system comprising a video encoder and video decoder is referred to. A video encoder transforms an input video into a compressed representation suited for storage/transmission and a video decoder uncompress the compressed video representation back into a viewable form. The video encoder may discard some information in the original video sequence in order to represent the video in a more compact form (that is, at lower bitrate).

A bitstream may be defined as a sequence of bits, which may in some coding formats or standards be in the form of a network abstraction layer (NAL) unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

Hybrid video codecs, for example ITU-T H.263 and H.264 may encode the video information in two phases. Firstly, pixel values in a certain picture are (or "block") are predicted for example by motion compensation means (finding and indicating an area in one of the previously coded video frames that corresponds closely to the block being coded) or by spatial means (using the pixel values around the block to be coded in a specified manner). Secondly, the prediction error, i.e. the difference between the predicted block of pixels and the original block of pixels, is coded. This may be done by transforming the difference in pixel values using a specified transform (e.g. Discrete Cosine Transform (DCT) or a variant of it), quantizing the coefficients and entropy coding the quantized coefficients. By varying the fidelity of the quantization process, the video encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, exploits temporal redundancy. In inter prediction, the sources of prediction are previously decoded pictures.

Intra prediction utilizes the fact that adjacent pixels within the same picture are likely to be correlated. Intra prediction can be performed in spatial or transform domain, i.e., either sample values or transform coefficients can be predicted. Intra prediction may be exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The video decoder may reconstruct the output video by applying prediction means similar to the video encoder to form a predicted representation of the pixel blocks (using the motion or spatial information created by the video encoder and stored in the compressed representation) and prediction error decoding (inverse operation of the prediction error coding recovering the quantized prediction error signal in spatial pixel domain). After applying prediction and prediction error decoding means, the video decoder sums up the prediction and prediction error signals (pixel values) to form the output video frame. The video decoder (and video encoder) may also apply additional filtering means to improve the quality of the output video before passing it for display and/or storing it as prediction reference for the forthcoming frames in the video sequence.

In video codecs, the motion information is indicated with motion vectors associated with each motion compensated image block. Each of these motion vectors represents the displacement of the image block in the picture to be coded (in the video encoder side) or decoded (in the video decoder side) and the prediction source in one of the previously coded or decoded pictures. In order to represent motion vectors efficiently, those may be coded differentially with respect to block specific predicted motion vectors. In video codecs, the predicated motion vectors may be created in a predefined way, for example, calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of the previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In video codecs, the prediction residual after motion compensation may be first transformed with a transform kernel (like DCT) and then coded. The reason for this is that often there still exists some correlation among the residual and transform can in many cases help reduce this correlation and provide more efficient coding.

Video encoders may comprise rate-distortion optimization e.g. for coding mode and parameter selection, where an amount of distortion is optimized against the amount of bitrate in a weighted manner. In practice, video encoders may utilize Lagrangian cost functions to find optimal coding modes, e.g. the desired mode for a block (e.g. among modes of an intra-coded block and inter-coded block) and parameters for the selected mode, such as associated motion vectors for an inter-coded block. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R$$

where C is the Lagrangian cost to be minimized, D is the image distortion (e.g. Mean Squared Error) with the mode and motion vectors considered, and R is the number of bits needed to present the required data to reconstruct the image block in the video decoder (including the amount of data to represent the candidate motion vectors).

Figure 2:
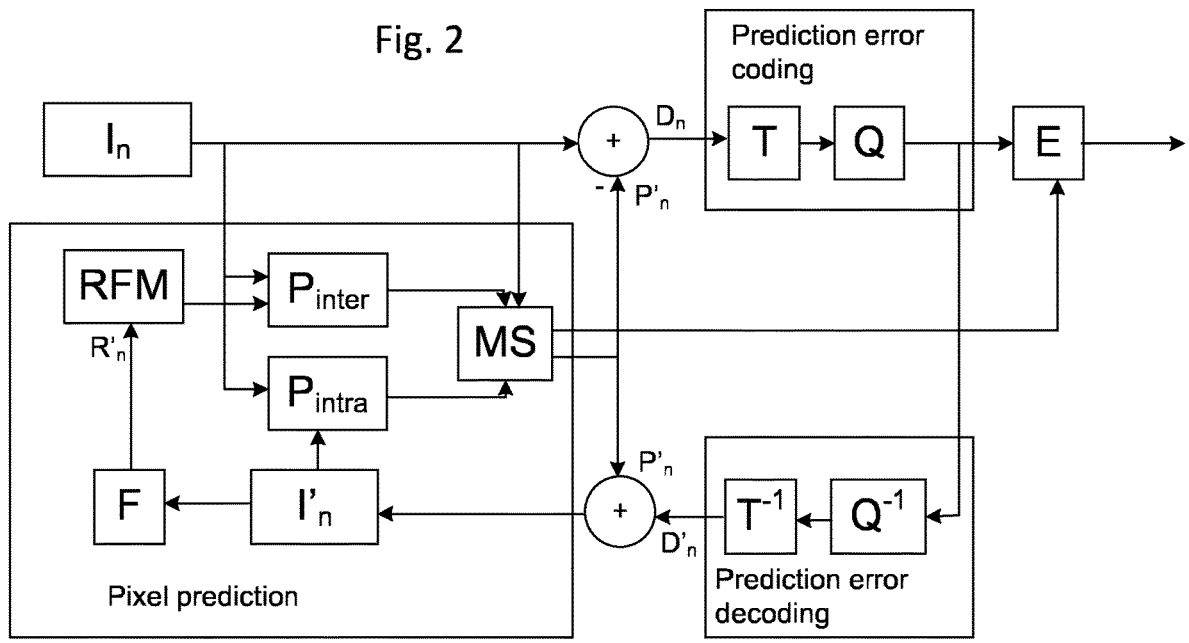
FIG. 2 shows an example of a encoding process.
Figure 3:
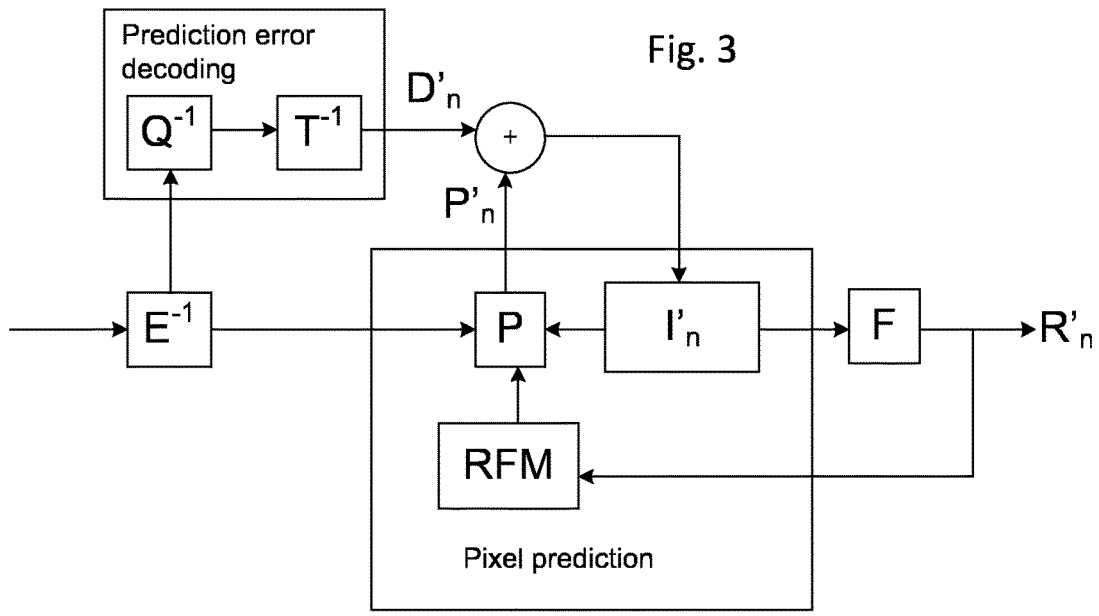
FIG. 3 shows an example of a decoding process.

The video material captured or generated by any of the image sources can be provided for an encoder that transforms an input video into a compressed representation suited for storage/transmission. The compressed video is provided for a decoder that can uncompress the compressed video representation back into a viewable form. The encoder may be located in the image sources or in the server. The decoder may be located in the server or in the viewer, such as a HMD. The encoder may discard some information in the original video sequence in order to represent the video in a more compact form (that is, at lower bitrate). An example of an encoding process is illustrated in FIG. 2. FIG. 2 illustrates an image to be encoded ($I_n$); a predicted representation of an image block (P'n); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F). An example of a decoding process is illustrated in FIG. 3. FIG. 3 illustrates a predicted representation of an image block ($P'_n$); a reconstructed prediction error signal ($D'_n$); a preliminary reconstructed image (I'''; a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Conventionally, the filtering in video codecs may for example include one more of the following: deblocking, sample adaptive offset (SAO), and/or adaptive loop filtering (ALF).

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9−3)/16, when omitting the potential impact of a clipping operation.

An example of SAO is given next with reference to the High Efficiency Video Coding standard (HEVC); however, SAO can be similarly applied to other coding schemes too. In SAO, a picture is divided into regions where a separate SAO decision is made for each region. In HEVC, the basic unit for adapting SAO parameters is a coding tree unit, CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in some embodiments divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The adaptive loop filter (ALF) is another method to enhance quality of the reconstructed samples. This may be achieved by filtering the sample values in the loop. In some embodiments the encoder determines which region of the pictures are to be filtered and the filter coefficients based on e.g. RDO and this information is signalled to the decoder.

As mentioned, image and video codecs may use a set of filters to enhance the visual quality of the predicted visual content and can be applied either in-loop or out-of-loop, or both. In the case of in-loop filters, the filter applied on one block in the currently-encoded frame will affect the encoding of another block in the same frame. An in-loop filter can affect the bitrate and/or the visual quality. In fact, an enhanced block may cause a smaller residual (difference between original block and predicted-and-filtered block) because it will affect the (intra or inter) prediction of other blocks, thus requiring less bits to be encoded. The result of applying an out-of-the loop filter will not affect the residual of other blocks, and thus it may only impact the visual quality of the filtered blocks.

A neural network (NN) filter may be used in addition to one or more other filters in video codecs (either in sequence or in parallel, or both) or may be used instead of other filters in video codecs, where the other filters may include but are not limited to one or more of the following: a deblocking filter, an SAO filter, and an adaptive loop filter. Neural networks may be trained based on a certain dataset. Datasets may be biased and may not represent well the real distribution of data in real life. As a consequence, a neural network performing a filtering operation may not always perform optimally and sometimes it may occur that a conventional filter may perform better. In yet other cases, a combination of neural network filters and conventional filters may perform well. However, this means that information about the combining operation needs to be sent from a video encoder to a video decoder, by encoding it into the bitstream, which may increase the bitrate. This bitrate overhead may be even more impactful to the final bitrate for the smaller block sizes, when the combination information is encoded for each block.

The present embodiments aim to improve the operation of a neural network (NN) filter used in a decoding loop of a video codec. This aim may be achieved by a method and a technical equipment for implementing the method. Despite a filter is used as an example, the present embodiments are not limited to filters. Thus, the present embodiments can be applied also for other neural networks used in the decoding loop. In addition, the present embodiments are not limited to neural networks, but can be extended also to other learning-based algorithms.

In the present embodiments, neural networks, particularly neural network filters, are used as example. Furthermore, if multiple learning-based filters are used, according to an embodiment, the present solution may involve one or more of those filters (thus, "NN filter" may refer to one or more NN filters).

The present embodiments are discussed in more detailed with reference to a case, where the output of a neural network filter is combined with the output of another process. The other process may be another filter (such as another NN filter, or another filter) or it may even be the input to the neural network filter.

The combination of the output of the neural network filter with the output of another process may be done by using a linear combination or other algorithms such as a neural network. In the following, linear combination is, however, used as an example.

The weighting coefficients, i.e. one or more combination parameters, for the linear combination are expected to be included into the bitstream, for example for each block of the input frames. This will generate some bitstream overhead. The present embodiments aim to remove or reduce such overhead.

The result of the combination is used to improve the NN filter. In particular, the result of the combination refers here to the combination result for previously decoded blocks, and it is used to improve the filter's performance on one of the next-to-be-decoded blocks.

According to an embodiment, the combination result is used as ground-truth for a fine-tuning process.

According to another embodiment, the combination result is used as additional input for the NN filter.

The embodiments referred to above are discussed in more detailed manner in the following.

The embodiments relate to an example of compressing and decompressing video data. It is assumed that both the video encoder and the video decoder have the sufficient computational, memory and power capabilities to run one or more neural network or other learning-based algorithms. According to some embodiments, only inference (one forward pass) may be needed, whereas according to some other embodiments, both training (one or more pairs of forward and backward passes) and inference may be needed.

Filtering may be performed by using at least one NN filter. It is also assumed that the output of the NN filter is combined with one or more data sources, which may be one or more of the following:

The input of the NN filter

The output of one or more of other learning-based filters

The output of one or more of other conventional filters

Any combination of the above

The combination, which may be referred to as a combination process in some embodiments, may be performed for example by linear combination or by another neural network which may be pre-trained. Combination information, i.e. one or more combination parameters, such as weighting coefficients for the linear combination (or any other adaptation data for the neural network which performs the combination), is included into the bitstream by the video encoder. Thus, this combination information requires an overhead in the bitstream.

In the following, several embodiments are discussed with reference to FIGS. 4 to 11. It is appreciated that the figures comprise processing blocks that refer to conventional encoding and decoding processing blocks, as illustrated in and discussed with reference to FIGS. 2 and 3, respectively. Such processing blocks are for example prediction error computation 10, transform and quantization 20, inverse quantization and transform 30, entropy encoding/decoding 40, reconstructed prediction error signal 50, reconstruction 60, predictor 70. These processing blocks are included in each of the embodiments of FIGS. 4 to 7, and are not discussed any further, since the emphasis is given to the filtering operation.

Figure 4:
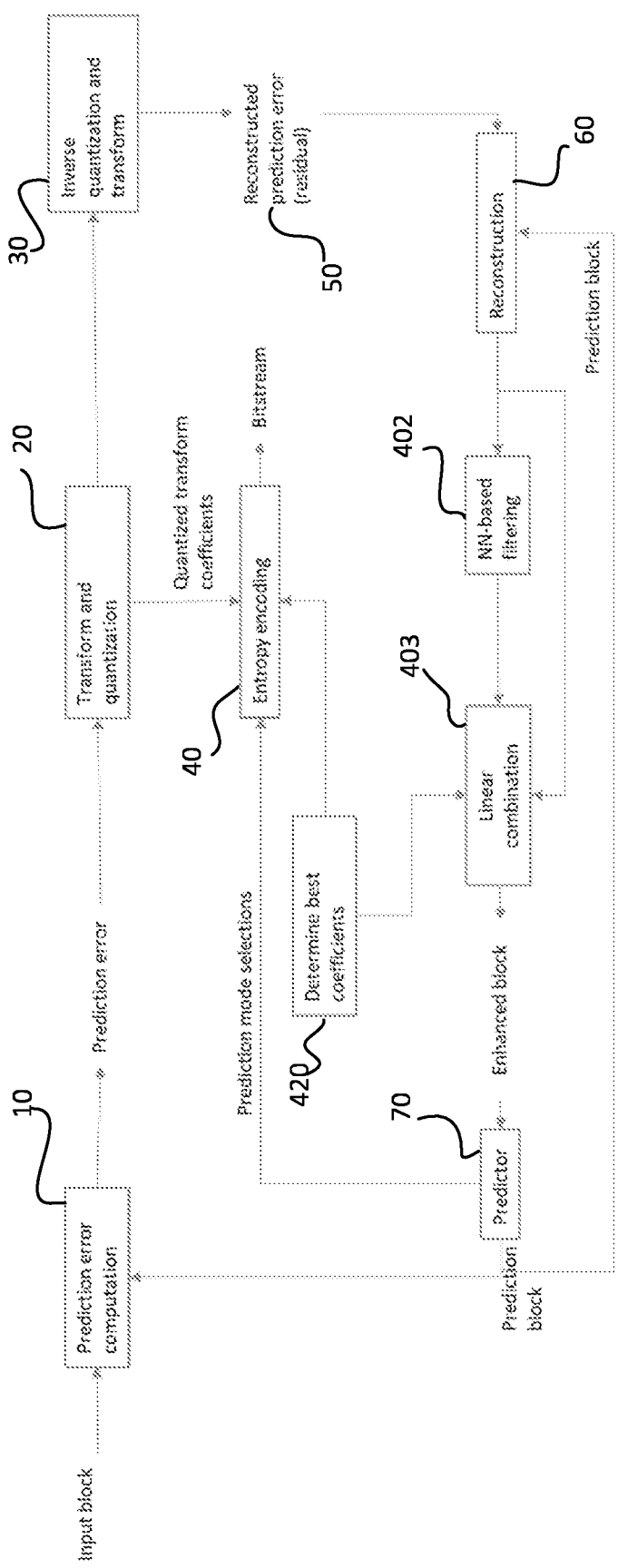
FIG. 4 shows a system according to a first embodiment.
Figure 5:
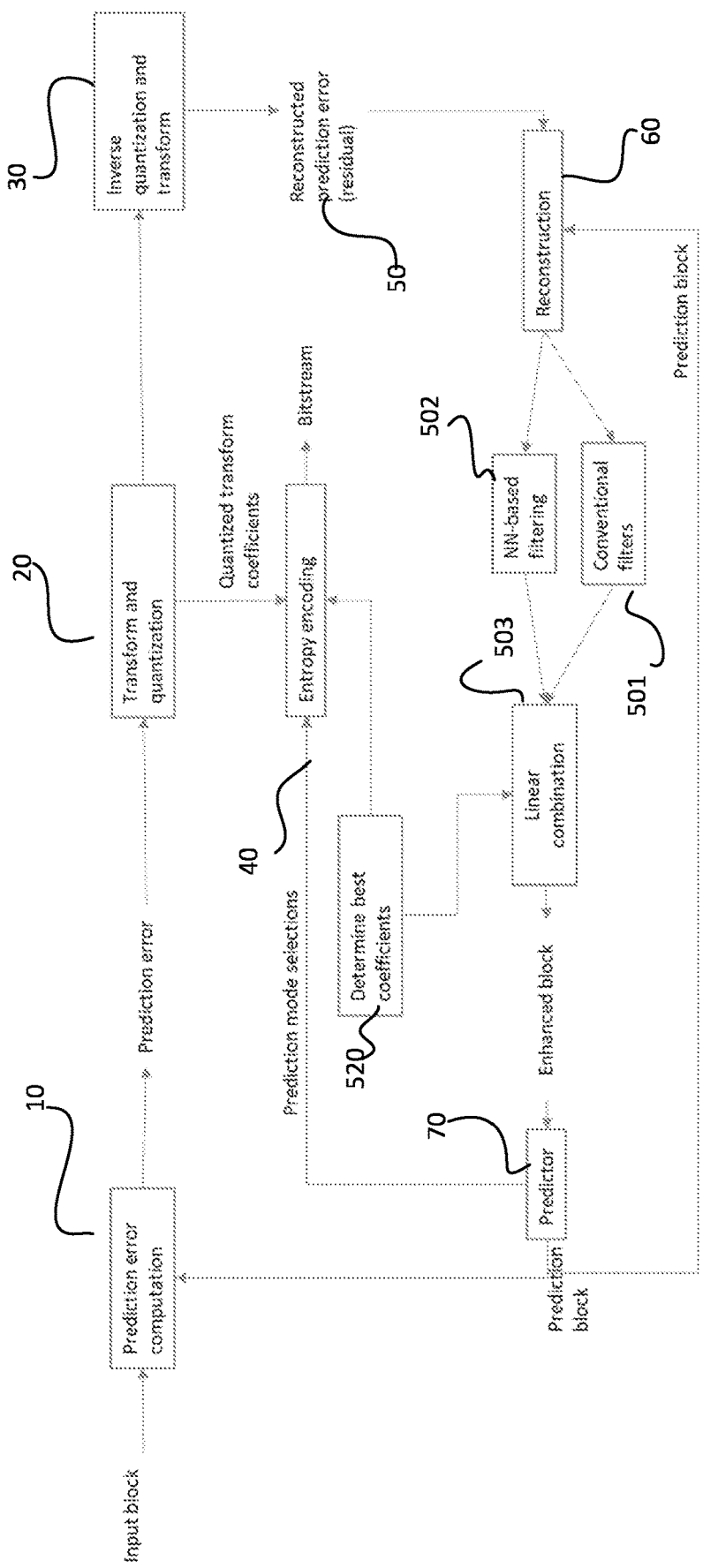
FIG. 5 shows a system according to a second embodiment.
Figure 6:
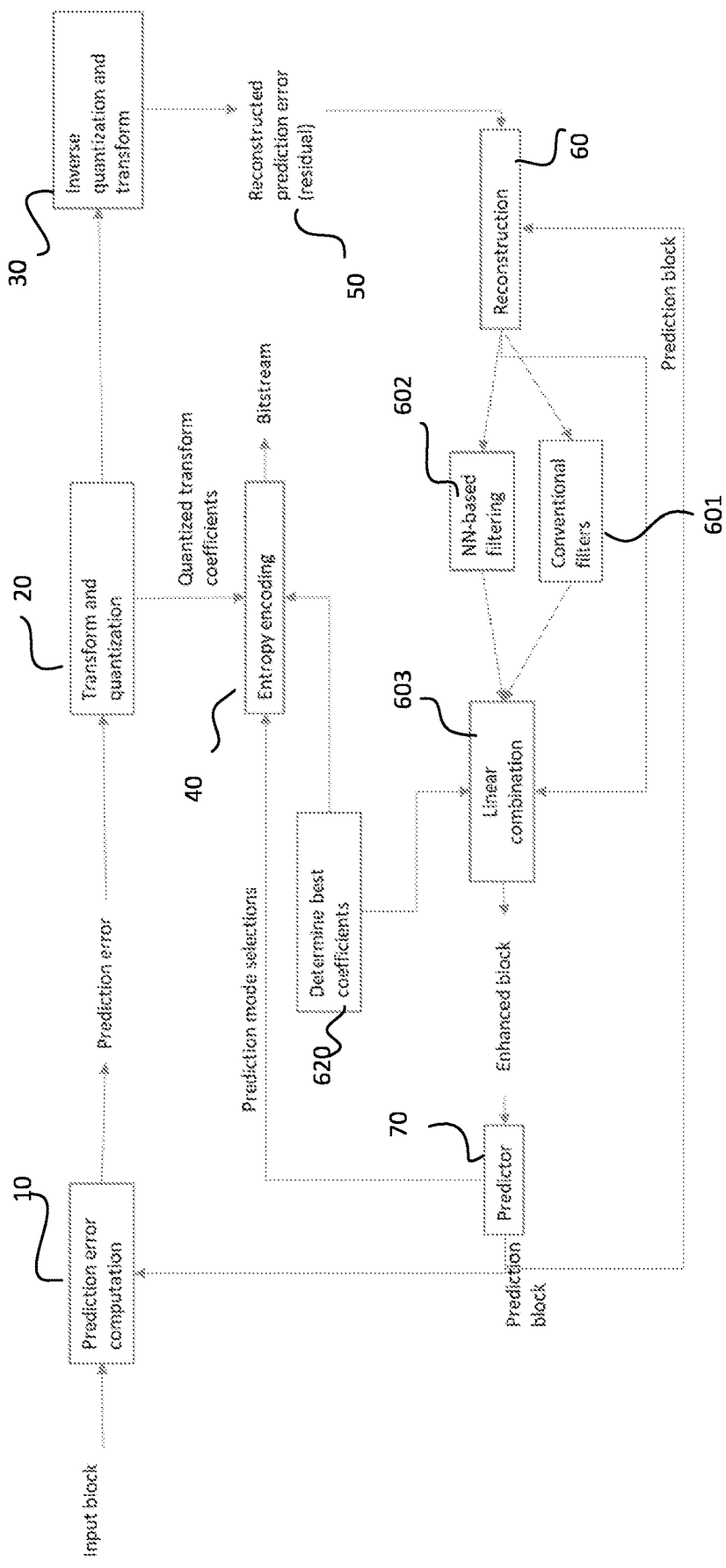
FIG. 6 shows a system according to a third embodiment.
Figure 7:
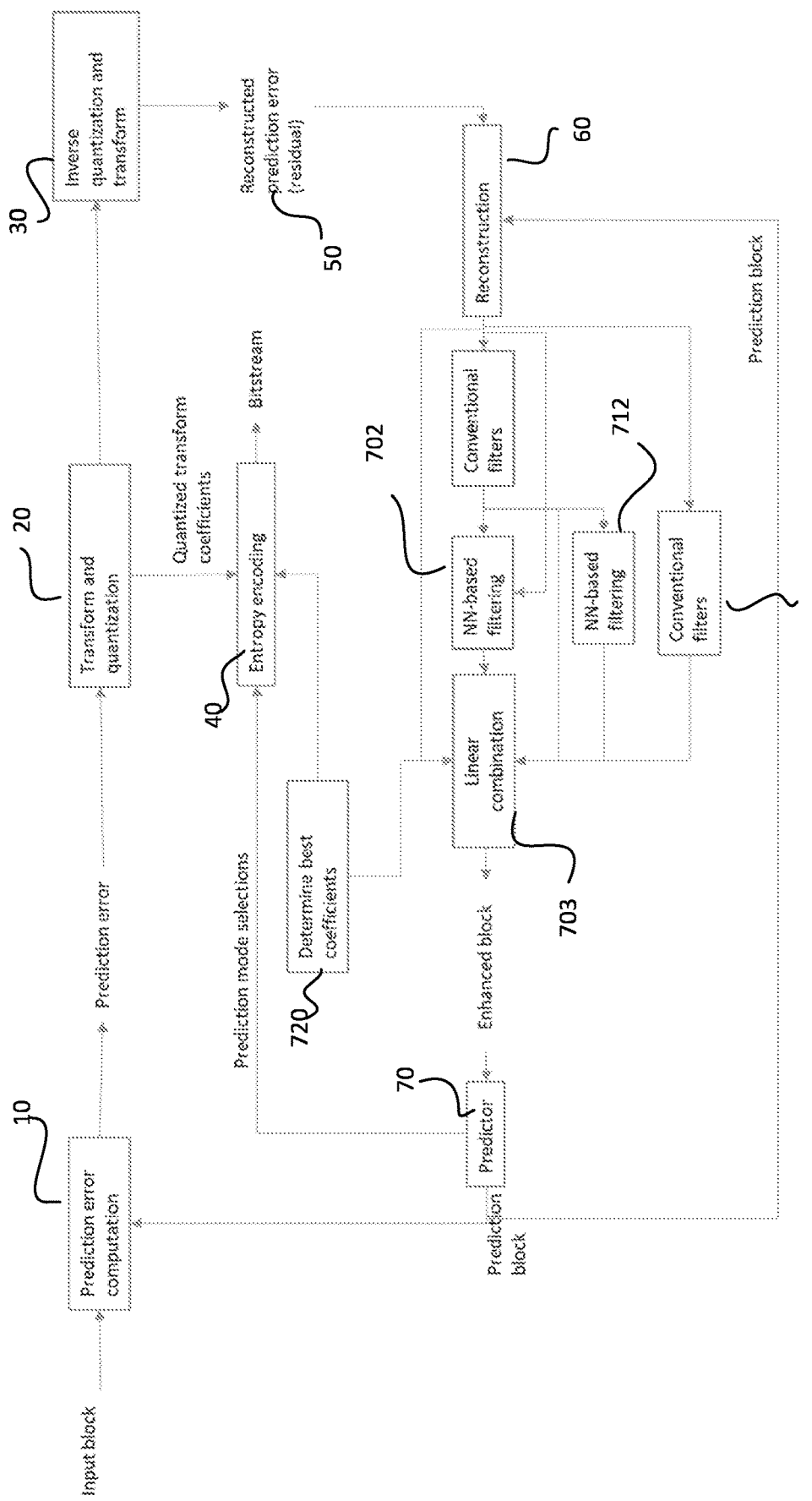
FIG. 7 shows a system according to a fourth embodiment.

Some examples of possible combinations are provided in FIGS. 4-7. FIG. 4 illustrates an embodiment, where the output of the NN filter 402 is combined 403 with the input of the NN filter 402. FIG. 5 illustrates an embodiment, where the output of the NN filter 502 is combined 503 with the output of conventional filter(s) 501. FIG. 6 illustrates an embodiment, where the output of the NN filter 602 is combined 603 with the output of the conventional filter(s) 601 and the input of the NN filter 602. FIG. 7 illustrates an embodiment, where the output of the NN filter 702 is combined 703 with the output of other NN filters 712 and with the output of other conventional filters 713. In each of the examples, one or more combination parameters 420, 520, 620, 720 are provided for the linear combination 403, 503, 603, 703 and also encoded 40 to the bitstream. The combination information may be different for each sub-block, for each block, for a set of blocks, for each frame, for a set of frames, for a video, or for a set of videos. Any combination of these options is also possible and in the scope of the present embodiments.

According to an embodiment, combination information may be included into the bitstream for each block during entropy encoding 40. Furthermore, the combination information may be subject to prediction (e.g., from nearby blocks in spatial dimension or in temporal dimension or in both dimensions) and to entropy coding. In some implementations, the linear combination 403, 503, 603, 703 of filter outputs may be restricted to apply a pre-determined set of weights. According to an example, the sum of weights for the NN output and conventional filter output may be specified not to exceed a certain threshold or add up to a certain value, such as one.

Linear combination 403, 503, 603, 703 of the filter outputs may be followed by one or more non-linear operations, such as clipping. As an example, an output sample value of the linear combination process in a specific location may be clipped to be in between the input sample value to the filtering process and the output sample value of the conventional filter at the same location. Similarly, the output samples of the linear combination can be clipped to a range determined by the input to the filtering process and the output of the NN-based filtering.

According to some implementations, the output of the filtering process may be calculated as a difference or an update, which may be added to the input of the filtering process. In this case, the linear combination may be performed for the difference samples and after the combination, the resulting samples can be added to the input of the filtering process.

First Embodiment: No Online Learning

In a first embodiment, combined outputs obtained for previously-decoded blocks are used as additional input information for the NN filter. In particular, both the inputs to the NN filter and the combined output for one or more of previously-decoded blocks are input as an additional information to the NN filter, in addition to the normal current input block.

This way, the NN filter has information about how it should have operated in one or more of the previously-decoded blocks.

The NN filter needs to be trained to perform this kind of operation, and the training is done in an offline stage, i.e., when developing a codec. Nonetheless, updates to the NN filter may still be performed even after deployment of the codec.

Figure 8:
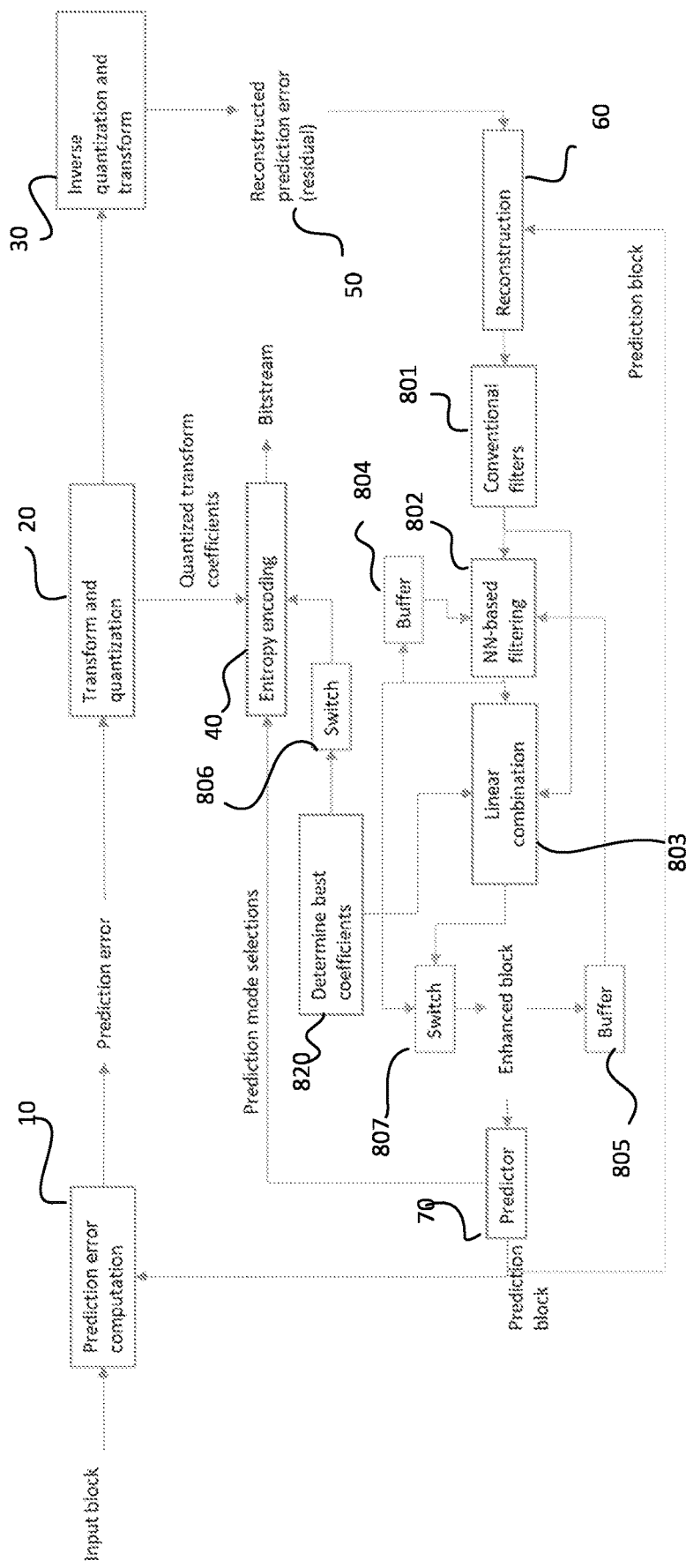
FIG. 8 shows a system according to an embodiment, where a conventional filter and NN filter are used in cascade.

FIG. 8 illustrates a first implementation of the first embodiment, where both conventional filter 801 and NN filter 802 are used, in cascade, and the combination process 803 is performed on the output of the conventional filter 801 (which is also input to NN filter 802) and the output of NN filter 802.

In the system of FIG. 8, the buffers 804, 805 are used to store the information about previously-decoded blocks for both the input to the NN filter 802 and output of the combination 803. The switches 806, 807 are binary switches (ON/OFF), and are configured to determine whether the combination 803 is performed or not for the current block. For example, the decision may be based on whether the NN filter 802 performs comparably well with respect the combination 803, based on a predefined accepted drop in accuracy. Thus, if the NN filter 802 performs comparably well, the weighting coefficients, i.e. one or more combination parameters, are not encoded into the bitstream, and the enhanced block is the output of the NN filter 802. A flag signaling whether the combination shall be performed or not, may be encoded into the bitstream for this case. The flag may be encoded with context-based arithmetic coding, using for example the respective flags from selected spatially neighboring blocks as the context. Consequently, encoding of the flag may occupy significantly less than one bit in the bitstream. In an alternative implementation, the weighting coefficients, i.e. one or more combination parameters, are still encoded, but they are assumed to require a low bitrate due to the more efficient prediction and entropy coding.

Figure 9:
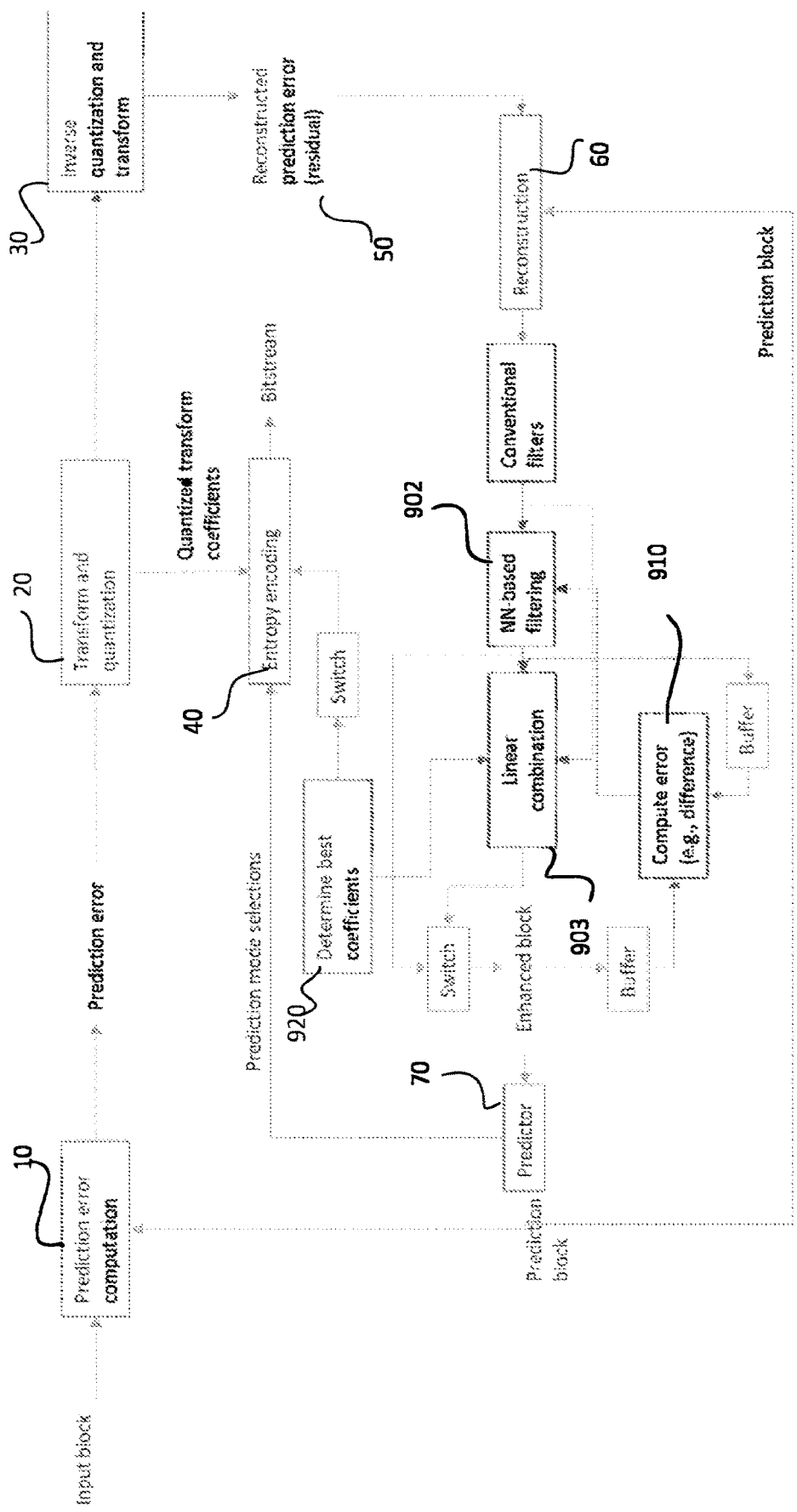
FIG. 9 shows a system according to an alternative embodiment for a system of FIG. 8.

FIG. 9 illustrates an alternative implementation for the first implementation shown in FIG. 8. In the example of FIG. 9, the information about the previously-decoded blocks consists of one or more blocks output by the NN filter 902, and the corresponding blocks output by the combination. According to the embodiment of FIG. 9, the information about the previously-decoded blocks is provided as an error 910 between the output of the NN filter 902 and the output of the combination 903, either as separate errors for different blocks or as an aggregated (e.g., averaged) error over all different blocks.

Figure 10:
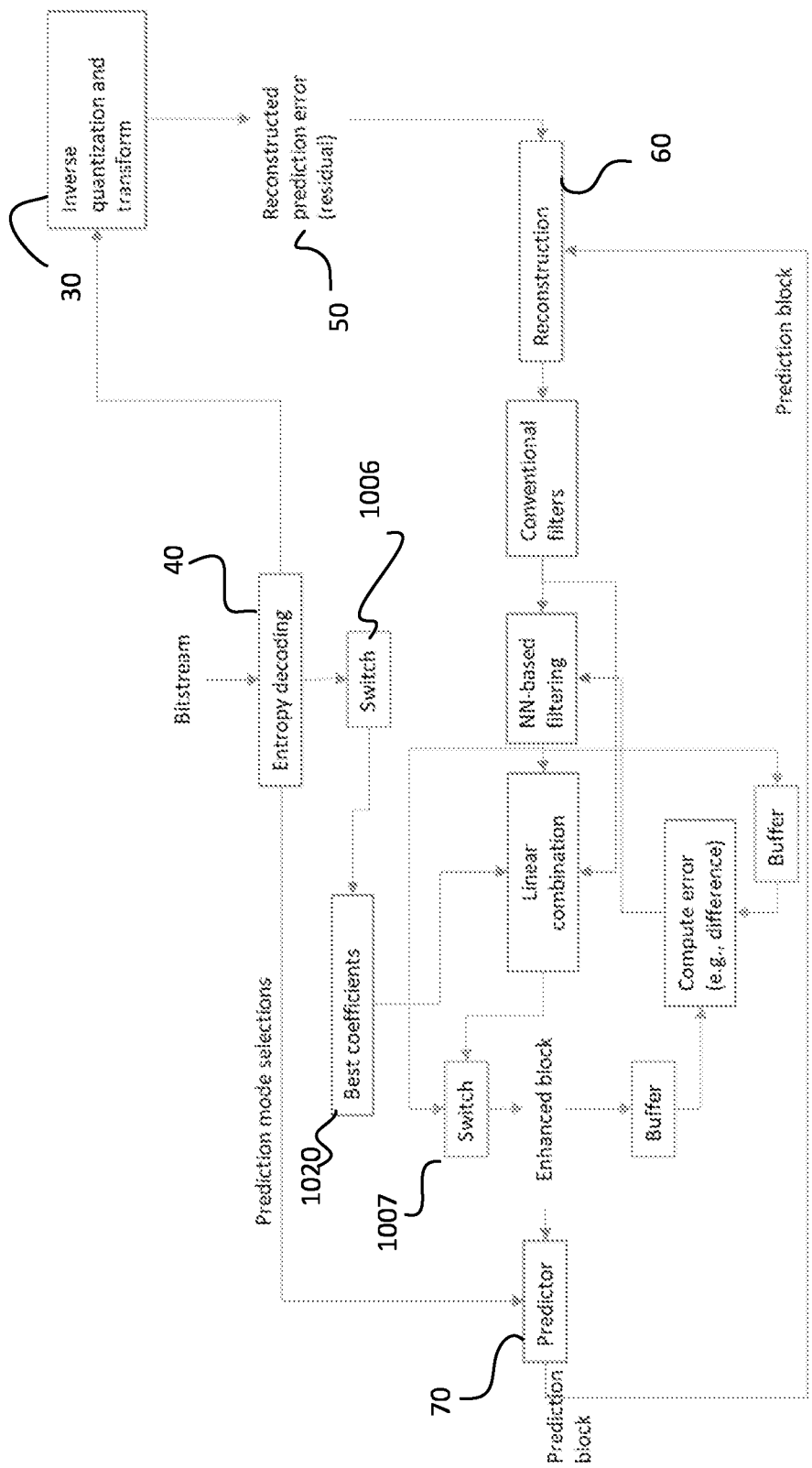
FIG. 10 shows a decoding process for the alternative embodiment shown in FIG. 9.

FIG. 10 illustrates the decoding process for the alternative shown in FIG. 9. The two switches 1006, 1007 are considered to be synchronized.

Second Embodiment: Online Learning

Figure 11:
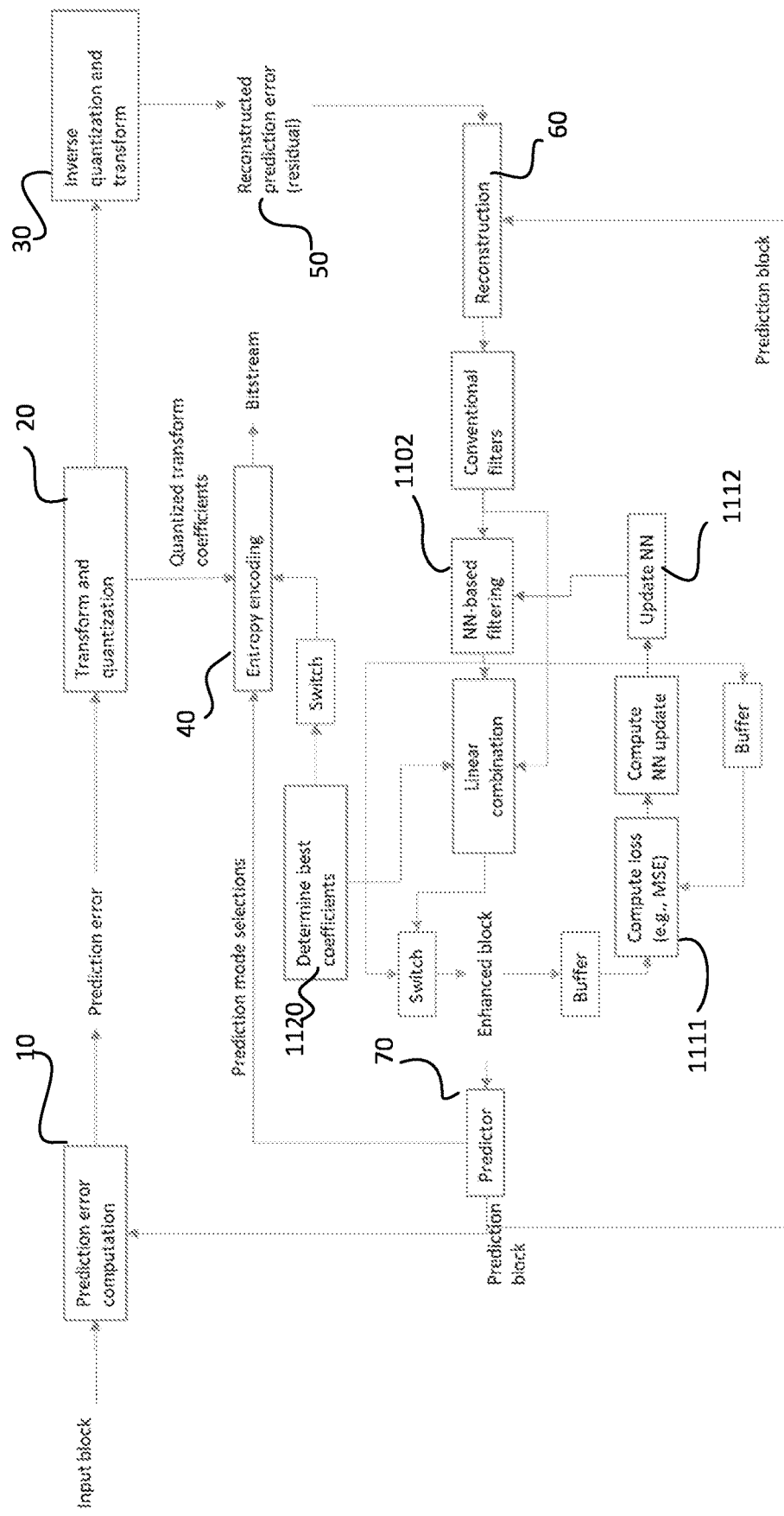
FIG. 11 shows an embodiment for online learning at a video encoder.

FIG. 11 illustrates an embodiment for online learning at video encoder side. In the embodiment shown in FIG. 11, the information about how the combination has performed for the previously-decoded blocks is given as input to the NN filter 1102 in an indirect way. This means that the input is not an additional input to the neural network 1102. Instead, a loss or error value 1111 is computed between the output of the NN filter 1102 for the previously-decoded blocks and the output of the enhanced blocks. The computed error value 1111 is used for updating 1112 the NN filter 1102. In particular, the NN filter 1102 may be fine-tuned, by performing one or more training iteration using a sufficiently small learning rate (this is needed in order not to bias the NN filter 1102 too much towards the current content). The training iteration may consist of differentiating the loss 1111 with respect to the NN filter's 1102 learnable parameters, for example by using the backpropagation algorithm, and by using the obtained gradients for updating the learnable parameters, for example by using Stochastic Gradient Descent algorithm or one of its variants (RMSprop, Adam, etc.).

For choosing whether to use directly the output of the NN filter 1102 or the combination, a similar mechanism as in the first embodiment can be used.

Figure 12:
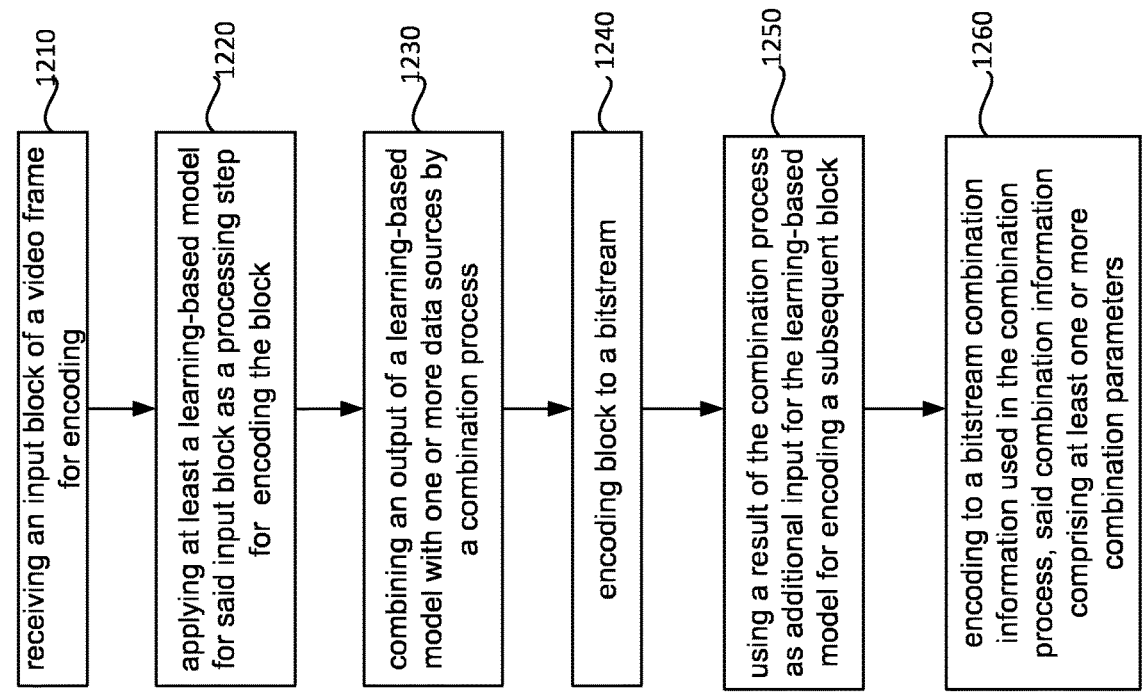
FIG. 12 is a flowchart illustrating a method according to an embodiment.

The method according to an embodiment is shown in FIG. 12. The method generally comprises receiving 1210 an input block of a video frame for encoding; applying 1220 at least a learning-based model for said input block as a processing step for encoding the block; combining 1230 an output of a learning-based model with one or more data sources by a combination process; encoding 1240 block to a bitstream; using 1250 a result of the combination process as additional input for the learning-based model for encoding a subsequent block; and encoding 1260 to a bitstream combination information used in the combination process, said combination information comprising at least combination parameters. Each of the steps can be implemented by a respective module of a computer system.

An apparatus according to an embodiment comprises means for receiving an input block of a video frame for encoding; means for applying at least a learning-based model for said input block as a processing step for encoding the block; means for combining an output of a learning-based model with one or more data sources by a combination process; means for encoding block to a bitstream; means for using a result of the combination process as additional input for the learning-based model for encoding a subsequent block; and means for encoding to a bitstream combination information used in the combination process, said combination information comprising at least one or more combination parameters. The means comprises at least one processor, and a memory including a computer program code, wherein the processor may further comprise processor circuitry. The memory and the computer program code are configured to, with the at least one processor, cause the apparatus to perform the method of FIG. 12 according to various embodiments.

Figure 13:
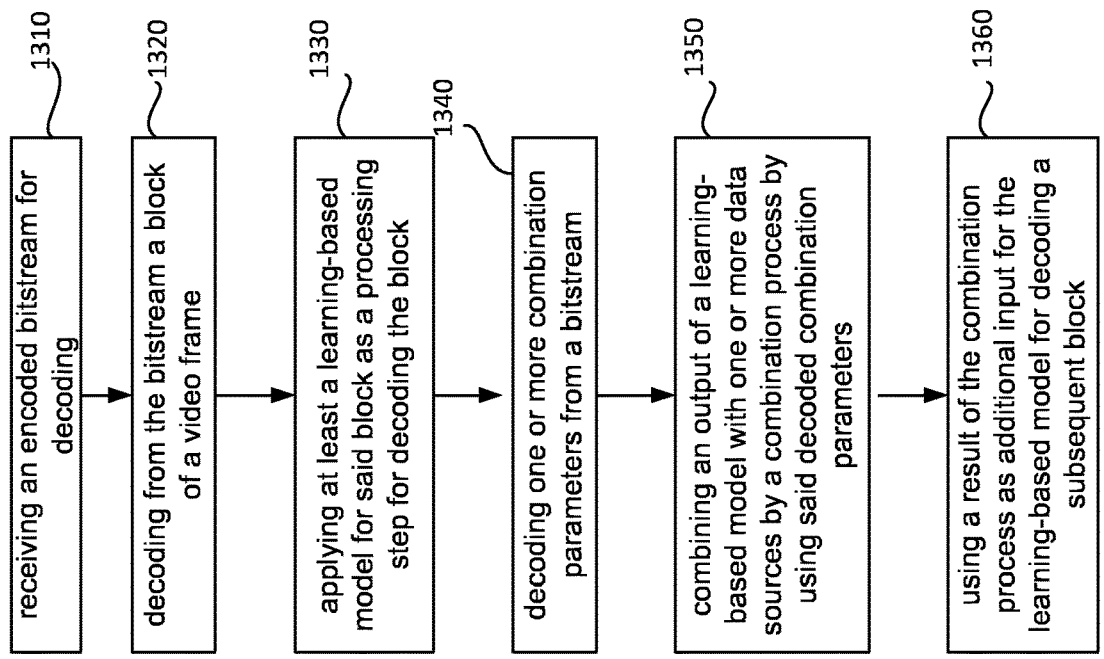
FIG. 13 is a flowchart illustrating a method according to another embodiment.

The method according to another embodiment is shown in FIG. 13. The method generally comprises receiving 1310 an encoded bitstream for decoding; decoding 1320 from the bitstream a block of a video frame; applying 1330 at least a learning-based model for said block as a processing step for decoding the block; decoding 1340 one or more combination parameters from a bitstream; combining 1350 an output of a learning-based model with one or more data sources by a combination process by using said decoded combination parameters; using 1360 a result of the combination process as additional input for the learning-based model for decoding a subsequent block. Each of the steps can be implemented by a respective module of a computer system.

An apparatus according to another embodiment comprises means for receiving an encoded bitstream for decoding; means for decoding from the bitstream a block of a video frame; means for applying at least a learning-based model for said block as a processing step for decoding the block; means for decoding one or more combination parameters from a bitstream; means for combining an output of a learning-based model with one or more data sources by a combination process by using said decoded combination parameters; means for using a result of the combination process as additional input for the learning-based model for decoding a subsequent block. The means comprises at least one processor, and a memory including a computer program code, wherein the processor may further comprise processor circuitry. The memory and the computer program code are configured to, with the at least one processor, cause the apparatus to perform the method of FIG. 13 according to various embodiments.

Figure 14:
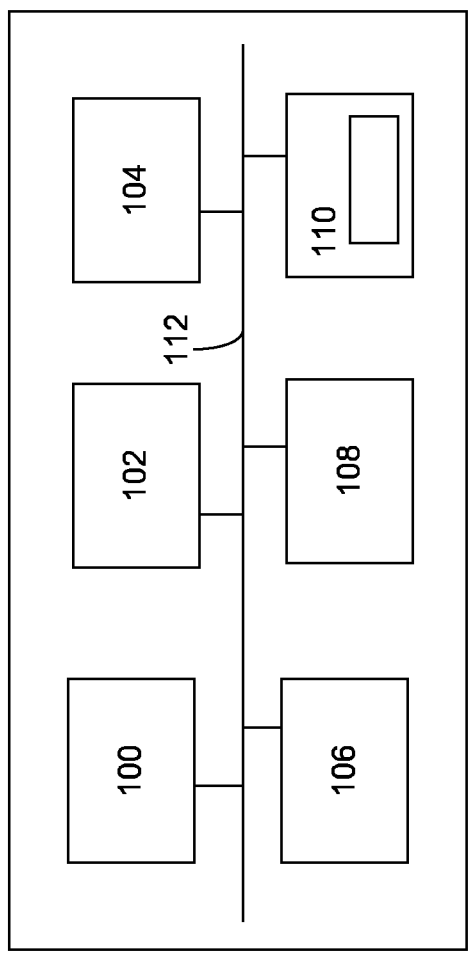
FIG. 14 shows an apparatus according to an embodiment.

FIG. 14 shows an apparatus for the purposes of the present embodiments. The generalized structure of the apparatus will be explained in accordance with the functional blocks of the system. Several functionalities can be carried out with a single physical device, e.g. all calculation procedures can be performed in a single processor if desired. A data processing system of an apparatus according to an example of FIG. 14 comprises a main processing unit 100, a memory 102, a storage device 104, an input device 106, an output device 108, and a graphics subsystem 110, which are all connected to each other via a data bus 112. An apparatus may be understood as a device or a software running on the device.

The main processing unit 100 is a processing unit arranged to process data within the data processing system. The main processing unit 100 may comprise or be implemented as one or more processors or processor circuitry. The memory 102, the storage device 104, the input device 106, and the output device 108 may include other components as recognized by those skilled in the art. The memory 102 and storage device 104 store data in the data processing system 100. Computer program code resides in the memory 102 for implementing, for example, machine learning process. The input device 106 inputs data into the system while the output device 108 receives data from the data processing system and forwards the data, for example to a display. While data bus 112 is shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

Embodiments have been described above in relation to neural network filter. It needs to be understood that embodiments apply similarly to any (de)coding tool or processing block in an encoder/decoder, which can be performed using a neural network. For example, embodiments apply similarly to:

neural network based transform and inverse transform
neural network based quantization and inverse quantization
neural network based prediction, such as NN-based intra prediction, NN-based motion compensation, or NN-based parameter prediction (e.g. motion vector prediction)

Some embodiments have been described above with reference to video (de)coding. It needs to be understood that embodiments similarly apply to image (de)coding, i.e. (de) coding a single image.

In the above, where embodiments have been described with reference to an encoder, it needs to be understood that the resulting bitstream and the decoder have corresponding elements in them. Several examples have been given where the correspondence between processing blocks of an encoder and a decoder are indicated. Thus, embodiments for a decoder can be realized by applying the correspondence between the processing blocks to the embodiments described with reference to an encoder. Likewise, where the embodiments have been described with reference to a decoder, it needs to be understood that the encoder has structure and/or computer program for generating the bitstream to be decoded by the decoder. Thus, embodiments for an encoder can be realized by applying the correspondence between the processing blocks to the embodiments described with reference to an decoder.

Some embodiments above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

It needs to be understood that different embodiments allow different parts to be carried out in different elements. For example, various processes of the computer system may be carried out in one or more processing devices; for example, entirely in one computer device, or in one server device or across multiple user devices. The elements of machine learning process may be implemented as a software component residing on one device or distributed across several devices, as mentioned above, for example so that the devices form a so-called cloud.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
receiving a block of a video frame for encoding;
applying at least a learning-based model for said block for encoding the block;
combining an output of the learning-based model with one or more data sources with a combination process;
encoding the block to a bitstream; and
encoding to the bitstream combination information used in the combination process, said combination information comprising at least one or more combination parameters, wherein the one or more combination parameters are configured to indicate how the output of the learning-based model is combined with the one or more data sources.

2. The method according to claim 1, where the learning-based model is a neural network.

3. The method according to claim 1, where the learning-based model is a neural network filter.

4. The method according to claim 1, where the one or more data sources comprise one or more of the following: input of the learning-based model; output of one or more learning-based filters; or output of one or more conventional filters.

5. A method, comprising:
receiving an encoded bitstream for decoding;
decoding from the encoded bitstream a block of a video frame;
applying at least a learning-based model for said block for decoding the block;
decoding one or more combination parameters from the bitstream; and
combining an output of the learning-based model with one or more data sources with a combination process using said one or more decoded combination parameters, wherein the one or more decoded combination parameters are configured to indicate how the output of the learning-based model is combined with the one or more data sources.

6. An apparatus comprising:
at least one processor; and
at least one memory storing instructions that, when executed with the at least one processor, cause the apparatus at least to:
receive a block of a video frame for encoding;
apply at least a learning-based model for said block for encoding the block;
combine an output of the learning-based model with one or more data sources with a combination process;
encode the block to a bitstream; and
encode to the bitstream combination information used in the combination process, said combination information comprising at least one or more combination parameters, wherein the one or more combination parameters are configured to indicate how the output of the learning-based model is combined with the one or more data sources.

7. The apparatus according to claim 6, where the learning-based model is a neural network.

8. The apparatus according to claim 6, where the learning-based model is a neural network filter.

9. The apparatus according to claim 6, where the one or more data sources comprise one or more of the following: input of the learning-based model; output of one or more learning-based filters; or output of one or more conventional filters.

10. The apparatus according to claim 6, wherein the combination process is a linear combination.

11. The apparatus according to claim 6, wherein the instructions, when executed with the at least one processor, cause the apparatus to:
use a result of the combination process as ground-truth for a fine-tuning process.

12. The apparatus according to claim 6, wherein the output of the learning-based model is determined as a difference or an update, wherein the instructions, when executed with the at least one processor, cause the apparatus to:
add the difference or the update to input of the learning-based model.

13. The apparatus according to claim 6, wherein the instructions, when executed with the at least one processor, cause the apparatus to:
determine a loss between the output of the learning-based model and output of one or more enhanced blocks; and
update the learning-based model using the determined loss.

14. An apparatus comprising:
at least one processor; and
at least one memory storing instructions that, when executed with the at least one processor, cause the apparatus at least to:
receive an encoded bitstream for decoding;
decode from the encoded bitstream a block of a video frame;
apply at least a learning-based model for said block for decoding the block;
decode one or more combination parameters from the bitstream; and
combine an output of the learning-based model with one or more data sources with a combination process using said one or more decoded combination parameters, wherein the one or more decoded combination parameters are configured to indicate how the output of the learning-based model is combined with the one or more data sources.

15. The apparatus according to claim 14, where the learning-based model is a neural network.

16. The apparatus according to claim 14, where the learning-based model is a neural network filter.

17. The apparatus according to claim 14, where the one or more data sources comprise one or more of the following: input of the learning-based model; output of one or more learning-based filters; or output of one or more conventional filters.

18. The apparatus according to claim 14, wherein the combination process is a linear combination or a neural network.

19. The apparatus according to claim 14, wherein the instructions, when executed with the at least one processor, cause the apparatus to:
use a result of the combination process as ground-truth for a fine-tuning process.

20. The apparatus according to claim 14, wherein the output of the learning-based model is determined as a difference or an update, wherein the instructions, when executed with the at least one processor, cause the apparatus to:
add the difference or the update to input of the learning-based model.

* * * * *